(12) United States Patent  
Jones (10) Patent No.: US 7,068,672 B1  
(45) Date of Patent: Jun. 27, 2006

(54) ASYNCHRONOUS RECEIVE AND TRANSMIT PACKET CROSSPOINT

(75) Inventor: James W. Jones, Penngrove, CA (US)

(73) Assignee: Calix Networks, Inc., Petaluma, CA (US)

( * ) Notice: Subject to any disclaimer, the term of this patent is extended or adjusted under 35 U.S.C. 154(b) by 802 days.

(21) Appl. No.: 09/874,395

(22) Filed: Jun. 4, 2001

(51) Int. Cl.  
*H04L 12/56* (2006.01)

(52) U.S. Cl. .................... 370/412; 370/413; 370/414; 370/462

(58) Field of Classification Search ........ 370/412–418, 370/419, 461–462, 463, 335, 447, 386  
See application file for complete search history.

(56) References Cited

U.S. PATENT DOCUMENTS

| | | | | |
|---|---|---|---|---|
| 4,623,996 A | * | 11/1986 | McMillen .................... | 370/418 |
| 5,327,420 A | * | 7/1994 | Lyles ......................... | 370/397 |
| 5,825,748 A | * | 10/1998 | Barkey et al. .............. | 370/236 |
| 5,892,766 A | * | 4/1999 | Wicki et al. ................ | 370/412 |
| 6,205,155 B1 | * | 3/2001 | Parrella et al. ............ | 370/462 |
| 6,563,818 B1 | * | 5/2003 | Sang et al. ................. | 370/379 |
| 6,622,182 B1 | * | 9/2003 | Miller et al. ................ | 710/29 |
| 2002/0018474 A1 | * | 2/2002 | Assa et al. ................. | 370/395.71 |
| 2002/0176429 A1 | * | 11/2002 | Calvignac et al. ......... | 370/411 |
| 2002/0191642 A1 | * | 12/2002 | Calvignac et al. ......... | 370/474 |

* cited by examiner

*Primary Examiner*—Hassan Kizou  
*Assistant Examiner*—Habte Mered  
(74) *Attorney, Agent, or Firm*—Silicon Valley Patent Group LLP (57) ABSTRACT

A packet crosspoint works with an arbiter to control the number of packets being received at the input ports of the cross-connect from traffic sources coupled thereto. This is accomplished by monitoring the number of packets waiting in buffers in the output ports, as well as the number of other packets which the arbiter has already granted for transmission to the input ports of the cross-connect, but which have not as of yet been received in the output queue of the destination output port. An audit mechanism is included for ensuring that output port grant counters do not drift upward based on the fact that some granted packets are lost in the system.

13 Claims, 7 Drawing Sheets

ASYNCHRONOUS RECEIVE AND TRANSMIT PACKET CROSSPOINT

COPYRIGHT

A portion of the disclosure of this patent document contains material that is subject to copyright protection. The copyright owner has no objection to the facsimile reproduction by anyone of the patent document or the patent disclosure, as it appear in the U.S. Patent and Trademark Office patent files or records, but otherwise reserves all copyright rights whatsoever.

BACKGROUND OF THE INVENTION

Description of the Related Art

The public switched telephone network (PSTN) was designed to perform one task: to transmit and switch uncompressed voice signals. Voice access services (typically individual telephone calls) over the PSTN are provided in 64 Kilobit per second (Kbps) increments called DS-0s. DS-0s are often gathered or aggregated into 1.5 Megabit per second (Mbps) increments called DS-1s and 45 Mbps increments called DS-3s. They are switched to their destinations in this aggregated form and then eventually split back out into individual DS-0s for delivery to a user on the other end. The PSTN was designed to provide high up-time to users, low latency and services such as caller ID.

During the previous two decades, however, the explosion of networks such as Intranets and the Internet has demanded ever-increasing access to these networks by businesses and individual users. At first, this access was provided through the existing PSTN. The system was quickly overwhelmed. Moreover, the time-division-multiplexed (TDM) nature of the PSTN did not accommodate very efficiently the bursty nature of data transmission and the resulting uneven bandwidth demands. As a result, other types of network architectures were created to accommodate the exploding demand for access to distributed computer networks. These include packet-switched networks such as frame relay, ATM (asynchronous transfer mode) and IP (Internet protocol). Each of these has their own specified technical requirements and protocols. Additionally, the advancement of fiber optic technology has led to the development of higher bandwidth synchronous protocols as well, such as SONET (Synchronous Optical Network).

Until recently, service providers have had to maintain separate network fabrics (or overlays) to handle these various classes of traffic. Maintaining separate overlays is expensive and makes network management very complex. As a result, application of mixed class access systems to the lower end of the network is too costly. Thus, it would be highly desirable to provide a single network access system that is capable of flexibly handling a broad mix of traffic classes, including both synchronous and asynchronous traffic types. Further, it would be desirable for this system to be capable of flexible configuration to perform multiple network functions such as network access system, a digital loop carrier (DLC), a transport level add/drop mux, etc. Such a system would require as one of its components an asynchronous packet cross-connect to route the asynchronous traffic such as UBR (unspecified bit rate) in the form of ATM unicast traffic. Those of skill in the art will recognize that an access system capable of handling a broad mix of traffic classes will require novel and non-obvious methods and apparatuses.

SUMMARY OF THE INVENTION

An asynchronous cross-connect in accordance with the invention switches asynchronous packet data, received from one or more traffic sources, between input and output ports. Both the input and output ports are buffered. The outputs are buffered in the event that once cross-connected, the packets may have to wait before they can be read from the output port by their respective data sinks. The number of packets permitted to be released are stored until they can be transmitted between their input and destination ports, and further until the data is released from the output port to its destination in a network. The number of packets being sent to the inputs of the cross-connect is controlled by the number of grants issued by an arbiter to the traffic sources. The rate of grants is controlled by several signals. First, there is a threshold on the number of packets allowed in the output buffers. If the number is exceeded, a signal is issued to cease grants for the output having the full buffer. Additionally, a grant counter associated with each output keeps track of all packets in the system for that output, and if the total number of packets in the system exceeds some threshold, the arbiter ceases granting any packets until the number of packets in the system destined for a particular output falls below some number. The output buffers are regulated first to avoid affecting the inputs and risking head-of-line blocking. Finally a grant audit is conducted periodically to prevent upward drift in grant counters on the outputs due to the loss of packets not received by the output buffers.

BRIEF DESCRIPTION OF THE DRAWINGS

The present invention may be better understood, and its numerous objectives, features and advantages made apparent to those skilled in the art by referencing the accompanying drawings. The use of the same reference number throughout the several figures designates a like or similar element.

DETAILED DESCRIPTION

In the following description, for the purposes of explanation, numerous specific details are set forth in order to provide a thorough understanding of the present invention. It will be apparent, however, to a person of ordinary skill in the art that the present invention may be practiced without these specific details. In other instances, well-known structures and devices are shown in block diagram form in order to avoid unnecessarily obscuring the present invention.

System Overview

Figure 1:
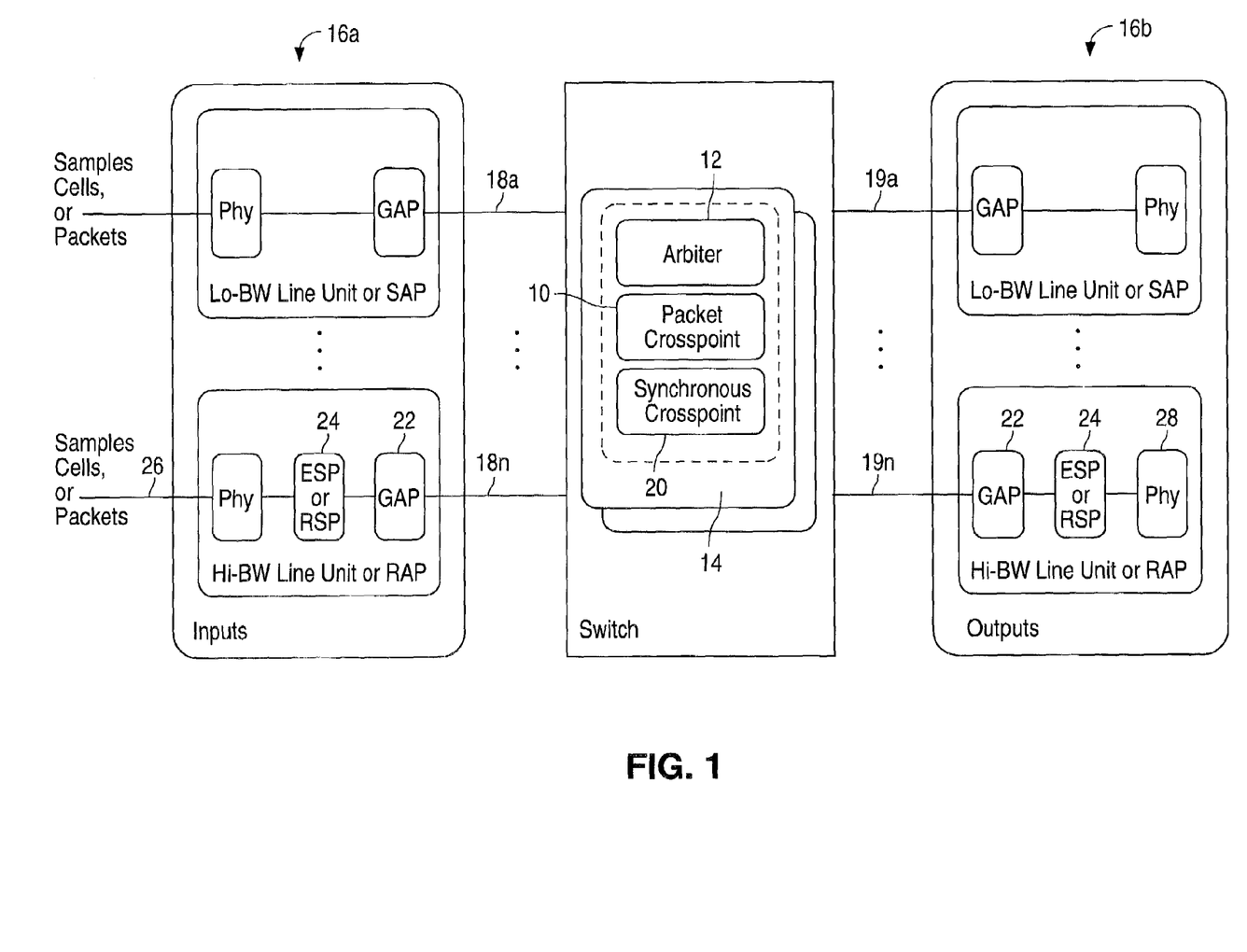
FIG. 1 shows a conceptual representation of a system in which the asynchronous packet cross-connect of the present invention may be employed.

FIG. 1 illustrates an input buffered common crosspoint architecture of one system that might employ the asynchronous cross-connect of the present invention. The asynchronous packet cross-connect 10 is part of the systems switching core 14. The system is architected with buffer memory distributed to the line units 16a and 16b. Buffering in the switch core 14 is limited to small rate adaptation buffers. The buffer memories (not shown) on the line units 16a, 16b are virtual output queues (VOQs). The core organizes queues by class of service (CoS) and destination output port. The arbiter 12 maintains images of the VOQs residing on each of the line units 16a, 16b. The VOQ images are kept up to date with packet arrival information sent upstream from the line units 16a, 16b to the switch core 14 via the receive side transmission links 18a–n. Unicast UBR class broadband data is transferred from a queue of a source line unit 16a to a destination line unit 16b output via asynchronous packet cross-connect 10 of the present invention, as they are granted by the arbiter 12. Unicast data may also be transferred from a source line unit queue to a destination line unit output via the packet cross-connect 10 without requiring a grant by the arbiter 12. The other traffic types that may be generated by source line units 16a, such as multicast broadband, STS (SONET transport stream), and TDM are routed through the synchronous cross-connect 20.

Figure 2:
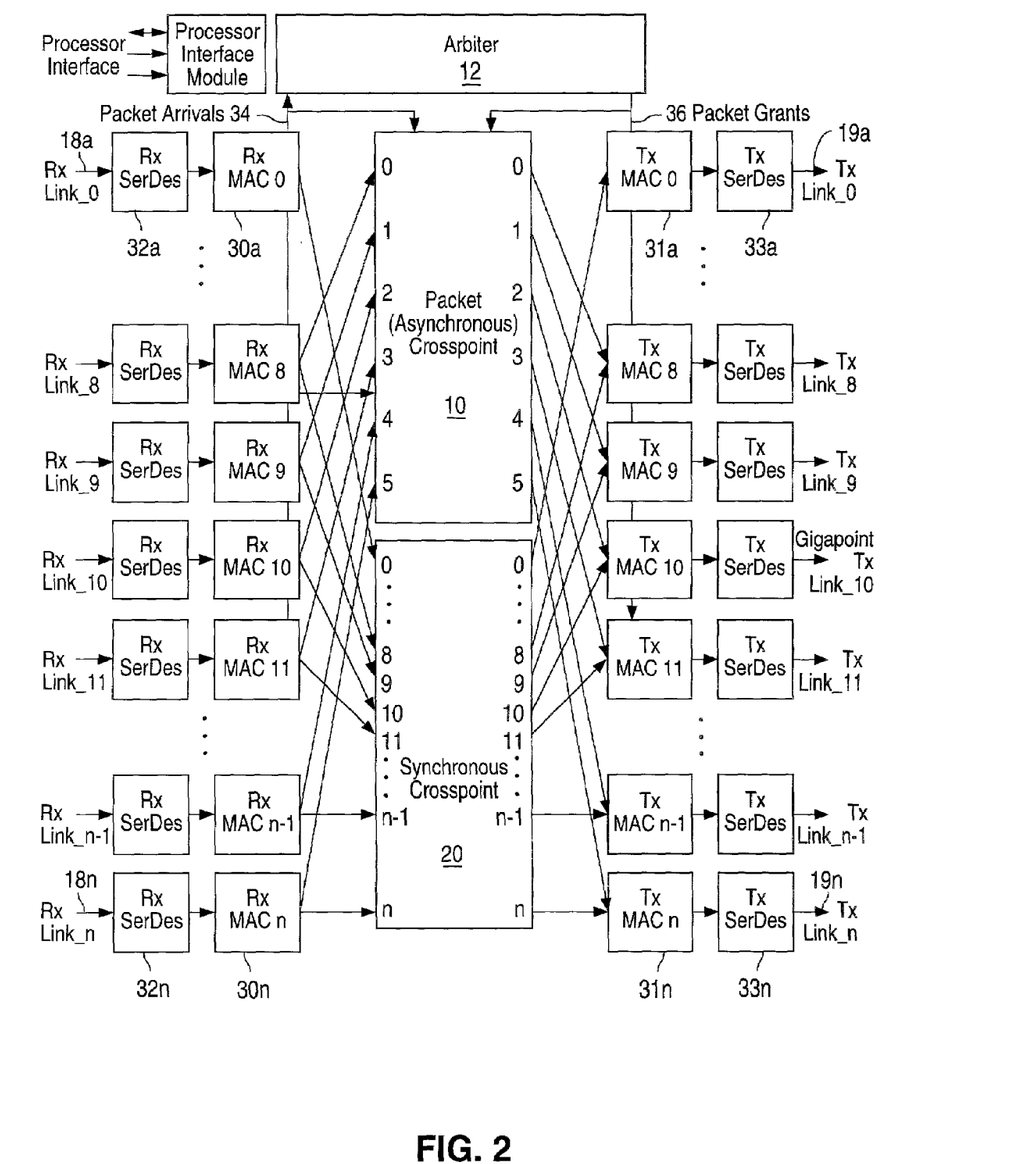
FIG. 2 illustrates a block diagram representation of a system in which the asynchronous packet cross-connect of the present invention may be employed.

The arbiter 12 determines when packets are granted based on the VOQ images (queue occupancy) it maintains and the bandwidth allocation that has been provisioned for each of the source line cards 16a. Depending upon the type of line unit, an access processor (GAP) 22 or a routing and switch processor (RSP) 24 appends flow identification, routing information, and other overhead control fields to the incoming packets 26. A packet is transferred to the packet cross-connect 10 in a 64 byte format. The 64 byte fixed length packet (FLP) may be either an extended ATM cell or a data packet. The packet is connected via the packet cross-connect 10 to a destination output 19a–n based on the routing map included in the header of the packet. At the output, depending on the type of line unit 16b, the GAP 22 or the RSP 24 strips the appended flow identification and routing map information and transmits out from the system through physical interface circuit (PHY) 28. For detailed information regarding an embodiment of a system such as the one just disclosed, refer to related and co-filed U.S. application Ser. No. 09/874,352 entitled "Concurrent Switching of Synchronous and Asynchronous Traffic" by Jason Dove et al., and which is incorporated herein in its entirety, including all Figures and Attachments, by this reference A block diagram of one embodiment of a multi-class system is depicted in FIG. 2. In the receive path, the receive media access controller (MAC) modules 30a–n interface with a Gigabit Ethernet serializer-deserializer (SerDes) receiver 32a–n. The Rx MACs 30a–n extract packet arrival and back-pressure fields from the packet headers and pass the information to the arbiter 12 and the Tx MACs 31a–n respectively. The Rx MACs 30a–n also provide data layer decoding by splitting STS, TDM, multicast packet, and unicast packet traffic. Only unicast packet traffic is routed to the packet cross-connect 10. The other traffic types are routed to the synchronous cross-connect 20. In the transmit path, the Tx MACs 31a–n combine the various traffic types output by the cross-connects 10 and 20 and output them to the SerDes Transmitters 33a–n. Also, the Tx MACs 33a–n insert packet grants and back-pressure fields into the packet headers. The packet cross-connect 10 snoops on the packet grant 36 and packet arrival 34 interfaces in support of a grant audit mechanism of the present invention.

Figures 3, 3A:
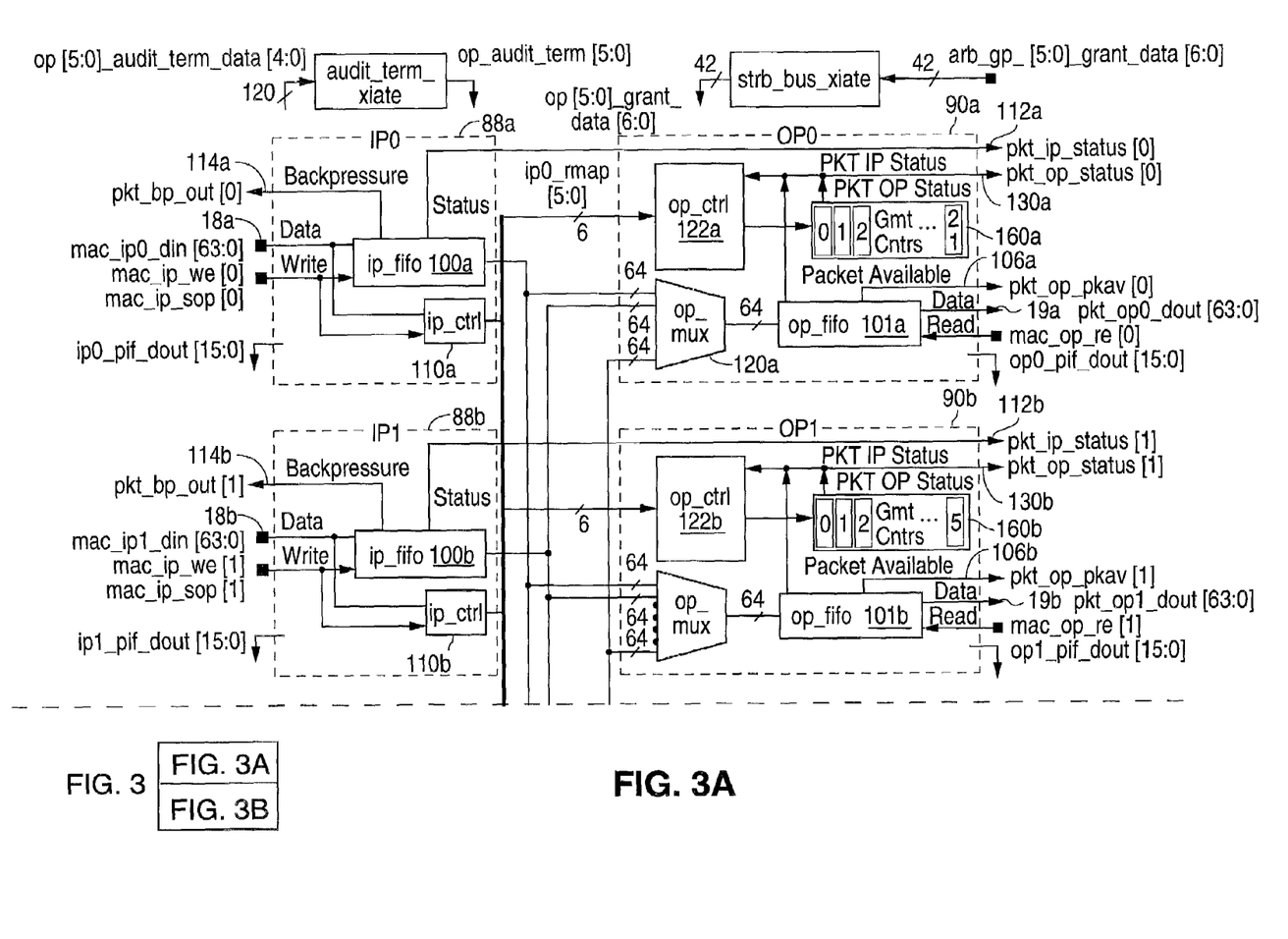
FIG. 3 illustrates a detailed block diagram representation of the asynchronous packet cross-connect of the present invention.
Figure 3B:
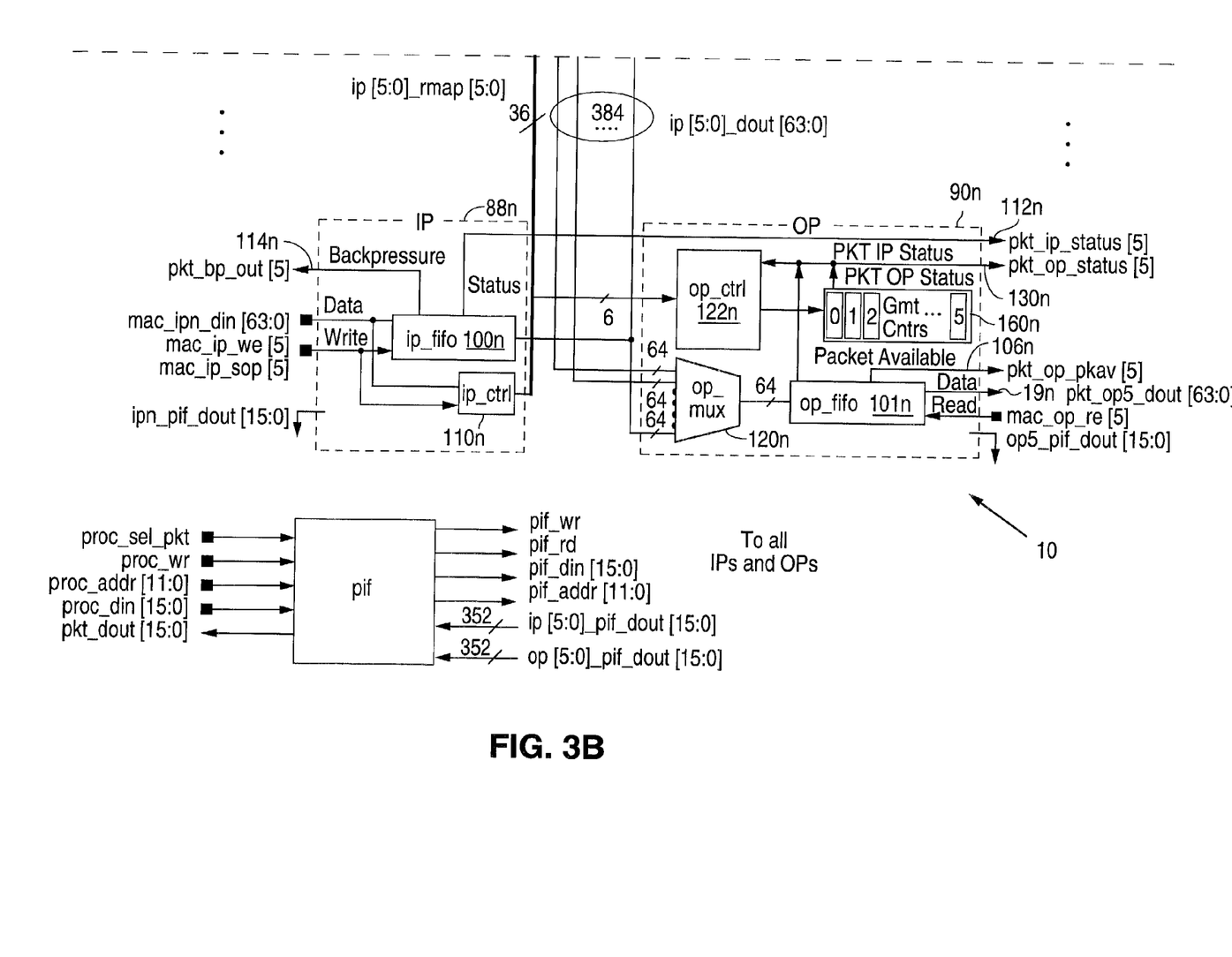

Those of skill in the art will recognize that the system previously disclosed is only one of many systems in which the packet cross-connect of the present invention may be employed. It is meant to be exemplary only, and is disclosed herein to provide context in which to illustrate the features of the packet cross-connect of the present invention, as well certain of the inputs received by and outputs provided by the outputs the packet cross-connect of the present invention Structure A block diagram of the packet cross-connect 10 is shown in FIG. 3. In one embodiment of the present invention, the packet cross-connect 10 cross-connects 64 byte packets from inputs 18a–n to outputs 19a–n over a 64 bit data path clocked at 77.76 MHz. This provides a throughput bandwidth equivalent to OC-96 per path where the peak packet traffic from any Rx MAC (30a–n, FIG. 2) could be a throughput bandwidth equivalent to OC-60. The faster rate of the packet cross-connect 10 core facilitates efficient clearing of any temporary head-of-line blocking that may occur at input FIFOs 100a–n. The faster rate of the packet cross-connect 10 core also insures that congestion occurs in output FIFOs 101a–n as opposed to the input FIFOs 100a–n. This allows output FIFO thresholds to operate as the primary controlling status to the arbiter 12.

The Rx MAC (30a–n, FIG. 2) associated with a packet cross-connect 10 input FIFO 100a–n writes 64 bit words into the FIFO as complete words become available. After a complete 64 byte packet has been written to the FIFO, the routing bit relevant to an output port 90a–n (one from each input port) is presented to the output port's arbiter submodule (not shown). At the beginning of each arbitration cycle, a port arbiter chooses a winning input to transfer to its output FIFO 101a–b. The arbitration algorithm is a simple round-robin algorithm. The arbitration cycles for the different outputs are preferably not synchronized to each other. After an entire packet has been transferred to an output FIFO 101a–n, the associated Tx MAC (31a–n) is signaled by asserting a packet available signal 106a–n. The Tx MAC can then read the output FIFO as needed in 64 bit word increments to interleave the packet words with the other traffic output from the synchronous cross-connect (20, FIG. 2).

In one embodiment, the input port FIFO 100a–n is a synchronous dual port RAM with pointer management logic. The data path is 64 bits wide. The depth is 16 packets, or 128 entries. The FIFO outputs to the input port controller 110a–n the current word count of the FIFO 100a–n. The input port controller 110a–n uses the word count to generate status and overflow signals. The threshold status signal pkt_ip_status 112a–n is sent to the arbiter (12, FIG. 2) to control the flow of packets and packet grants. The back-pressure status signal pkt_bp_out 114a–n is sent to the Tx MAC Module (31a–n, FIG. 2), which asserts the back-pressure bit in the packet header to stop the flow of packets from the GAP (22a, FIG. 1).

The depth required for the input FIFO 100a–n) is based on the latency incurred to stop the flow of cells from the time at which the programmable threshold is crossed. Up to three packet times may lapse from the time the threshold crossing is signaled to the Tx MAC (31a–n) before the Tx MAC asserts the back-pressure bit in the packet header sent to the GAP (22, FIG. 1). Up to six packet times is required for the back-pressure indication to reach the GAP. Up to three packet times is then required to synchronize the stopping of packets sent to the input FIFO (100a–n). In total, up to twelve packets could arrive at the input FIFO (100a–n) from the time the back-pressure threshold signal (114a–n) is asserted.

Figure 4:
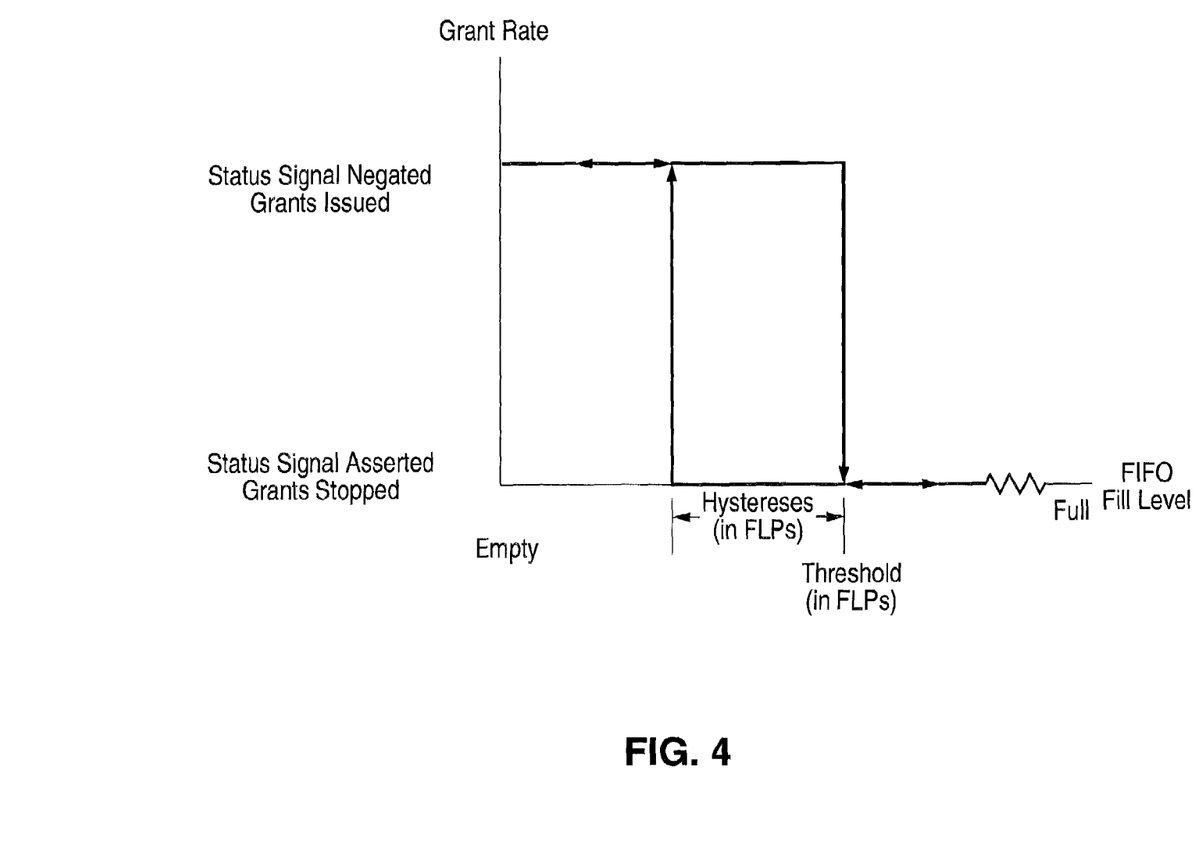
FIG. 4 illustrates the hysteresis employed in the implementation of the output FIFO threshold and the resulting packet output status signal used to control packet grants by an arbiter.

The input FIFO threshold and hysteresis settings are programmed to provide efficient metering depending on the traffic characteristics associated with the particular input FIFO as shown in FIG. 4. The FIFO threshold setting determines the FIFO level when filling at which the status signal to the arbiter (12, FIG. 2) is asserted to stop packet grants to the input FIFO 100 a–n). The FIFO hysteresis setting determines the FIFO level at which, when draining, the status signal to the arbiter (12, FIG. 2) is negated to start packet grants to the input FIFO.

The input port controller 110a–n performs the following functions. It captures routing maps for packets stored in the input FIFO 100a–n and outputs the map of the "head-of-line" packet after the packet is fully written to the input FIFO 100a–n. If a routing map has no bits set or more than one bit set, then the packet is discarded and an error bit is set in a status register. The input port controller 110a–n further logically ORs read enable strobes from the output ports 90a–n and outputs one read enable to the FIFO. Assumes no multicast during a packet transfer such that only one output port 90a–n at a time will assert a read of the input FIFO 100a–n. The input port controller 110a–n monitors the time between input FIFO reads and, based on the programmed input port FIFO timeout setting, discards the "head-of-line packet" and indicates an error condition if the timeout is exceeded. If the Rx MAC (30a–n, FIG. 1) indicates a packet error, the input port controller 110a–n deletes the partial packet that has already been input to the FIFO.

One embodiment of the output multiplexers 120a–n is simply a 6-to-1 clocked multiplexer with a 64 bit data path.

One embodiment of the output port FIFO 101a–n is a synchronous dual port RAM with pointer management logic. The data path is 64 bits wide. The depth is 32 packets, or 256 entries. The output port FIFO outputs to the output port controller 122a–n the current word count of the FIFO. The output port controller 122a–n uses the word count to generate status and overflow signals. The threshold status signal pkt_op_status 130a–n is sent to the arbiter to control the flow of packet grants.

The output FIFO 101a–n provides the buffering required to merge packets with traffic from the synchronous cross-connect (20, FIG. 2) and support metering the arbiter (12, FIG. 2) with a threshold status signal. The arbiter 12 is metered to match the packet grant rate output by the arbiter to the unicast output bandwidth made available by the Tx MAC 31a–n.

The output port controller 122a–n performs the following functions. It arbitrates among multiple input ports 88a–n requesting a transfer of a packet to the associated output FIFO 101a–n. Each output port controller's arbiter (12, FIG. 5) examines the routing map assembled from the input FIFOs 100a–n and performs a round-robin arbitration. After determining a winner, the arbiter (12, FIG. 5) performs the control operations that transfer the packet from input to output.

Figures 5, 5A:
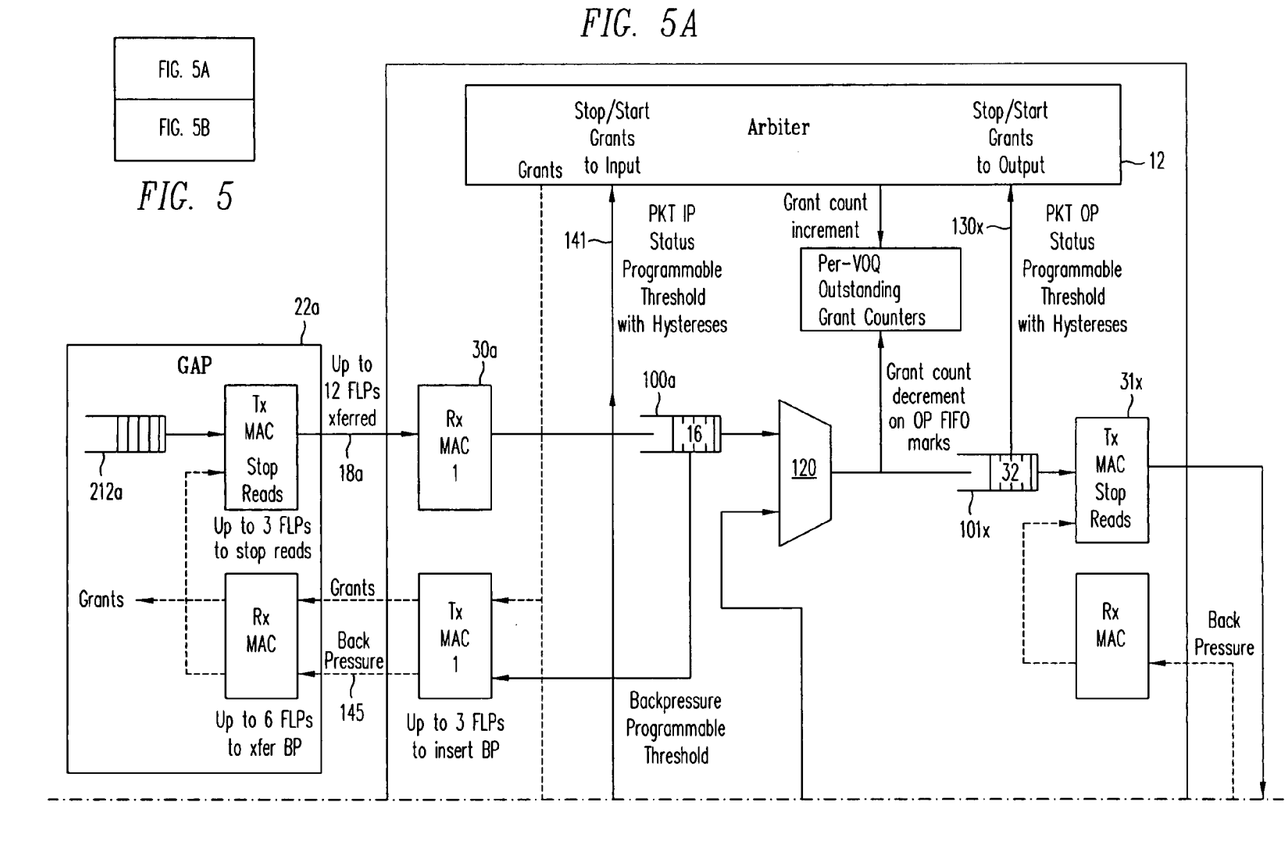
FIG. 5 is a conceptual block diagram of the packet grant control and packet flow between the asynchronous cross-connect of the present invention and the sources and destinations of packet traffic that are routed through the invention.
Figure 5B:
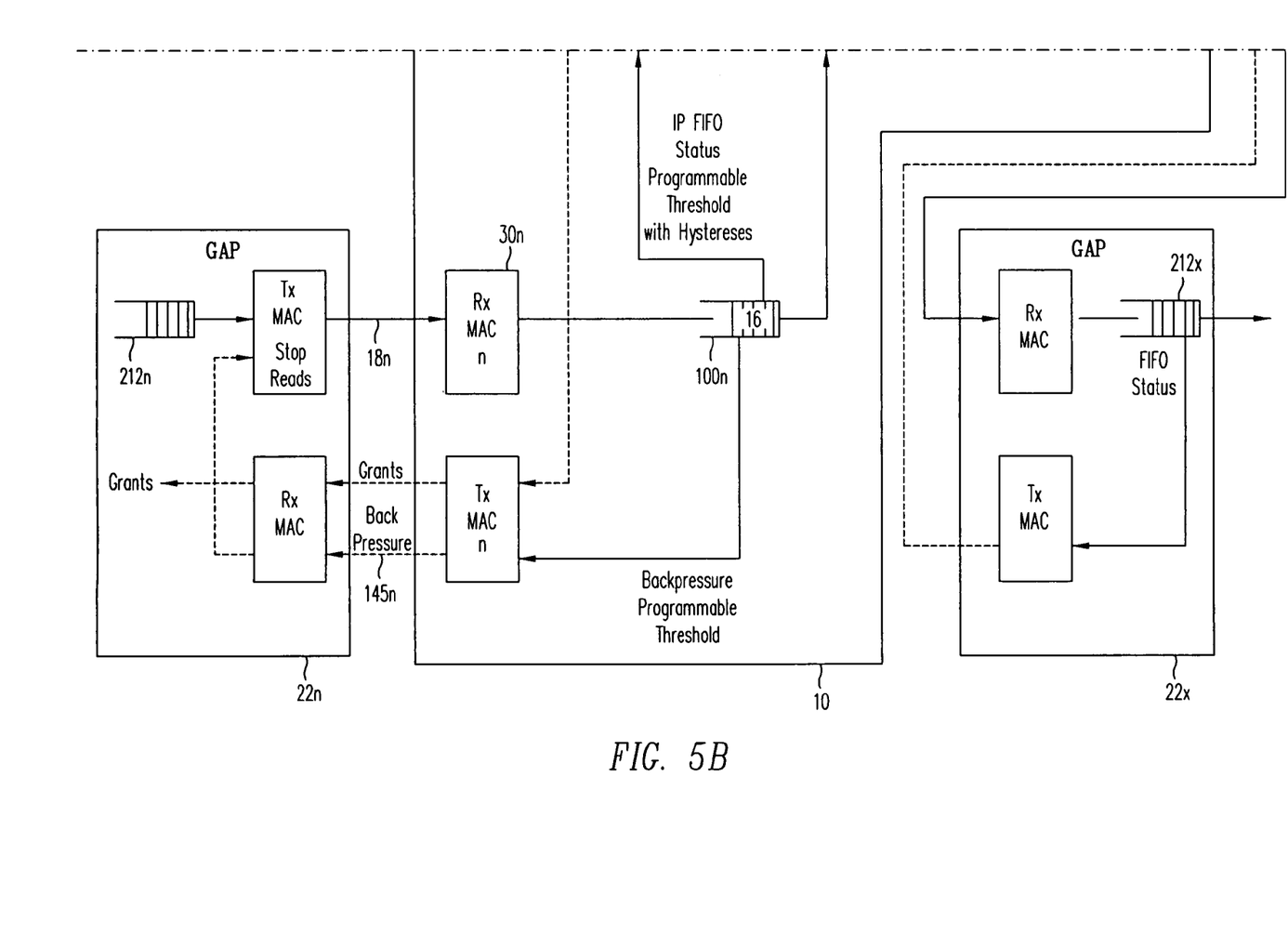

FIG. 5 depicts the system and method of the present invention implemented between the asynchronous cross-connect 10 of the present invention and a source of packet traffic such as a GAP (22, FIG. 1) to control the flow of unicast packets between sources and destinations. A more detailed discussion of the flow control mechanism for unicast packets through the packet cross-connect 10 is now presented with respect to FIG. 5.

FIG. 5 illustrates the source of packets as GAPs 22 as previously discussed. In one embodiment of the system, the GAPs 22 reside on line cards and receive and transmit data traffic between the physical layer of a network system. Those of skill in the art will recognize that the GAPs are coupled to a single I/O port of the asynchronous cross-connect and typically have a transmit and receive path. Moreover, it can be seen that the MAC functions are split between the GAPs and the asynchronous cross-connect 10 on either side of the Gigabit Ethernet SerDes (32a–n, 33a–n of FIG. 2). This because the data traffic must be prepared for transmission across the SerDes as the traffic across the backplane of a system between the line cards and the board comprising the switching core of the system. Those of skill in the art will recognize that the GAPs have both a receive and transmit path, and the spatial differentiation between input and output ports are made in the figures for clarity only.

The GAPs have input queues 212a–n and output queues 212x for buffering the traffic as it enters or leaves the system. The OP FIFO status signal provided by the output port FIFO 101a–n to the arbiter 12 is asserted if either the OP FIFO 101x threshold or the grant counter (160 a–n, FIG. 3) threshold is crossed. The OP FIFO threshold component of the feedback to the arbiter 12 provides a means for the arbiter 12 to match the rate of grants that it outputs to the bandwidth available to each of the output ports (90a–n, FIG. 3) of the asynchronous cross-connect 10.

The grant counters (160a–n, FIG. 3), which snoop the packet grant signal from the arbiter, provide feedback to the arbiter 12 to ensure that there are no more outstanding packets in the system destined to its associated output port than may ultimately be held in the output FIFO. The counters are incremented whenever a packet grant is issued for their respective output ports, and decremented each time one of the packets stored in their respective output FIFOs is read out. This prevents congestion at the output from backing up to the point that it begins to cause traffic to back up in any input FIFOs 100a–n. This therefore eliminates potential "head-of-line" blocking in the input FIFOs 100a–n in the case where all packets are granted but the one at the head-of-the-line of a particular input FIFO can't be transmitted because the output FIFO of its destination output port is full.

The arbiter stops issuing grants to all packets destined for an output FIFO when the status signal 130x for that output is asserted. The level at which the OP FIFO status signal 130x is asserted or negated when filling or draining respectively is programmable in increments of one packet by writing to an "Output FIFO Threshold Level" field of an Output Port Threshold Register and a "Grant Counter Threshold Level" field of an Output Port Grant Threshold Register. Both functions support an optional hysteresis setting. Writing a value to the hysteresis setting determines the number of packets or grants below the associated threshold setting at which the status signal is asserted when the FIFO or counter is draining. When using the hysteresis option, the threshold level field determines the FIFO or grant counter level at which the status signal is negated when the FIFO or counter is filling. Refer to FIG. 5 for an illustration.

The PKT IP status signal 141 protects the input FIFOs when temporary congestion occurs. For example, a condition that causes an input FIFO 100a–n to experience congestion occurs when a large number of inputs are destined to an output and the input GigaPoint links have differing unicast packet rates. The differing input rates lead to a distortion in time of the serialized grants to that output such that multiple packets arrive simultaneously at a number of input FIFOs. If one of the inputs is operating at a much higher packet rate than the other inputs, and that fast input was just granted by the arbiter for that output, then packets will accumulate in that input FIFO until the arbiter for the output gets back around the round robin to transfer the packets from the fast input to the output. If this case occurs, then the IP FIFO threshold is crossed which in turn causes the PKT IP Status signal 141 to be asserted causing the arbiter 12 to stop granting packets destined to the input FIFO of concern.

In addition, if the back-pressure threshold is crossed, a back-pressure signal is asserted to the associated Tx MAC 31*a–n* causing it to transport a back-pressure bit to the associated GAP 22*a–n* stopping packet flow into the input FIFO of concern. The level at which the IP FIFO status signal 141 is asserted or negated when filling or draining respectively is programmable in increments of one packet by writing to the "Input FIFO Threshold Level" field of an input port threshold register. The level at which the back-pressure status signal 145*a–n* is asserted or negated when filling or draining respectively is programmable in increments of one packet by writing to the "Back-pressure Threshold Level" field of an input port backpressure level register. In one embodiment, the back-pressure level should be programmed so the input FIFOs 100*a–n* have enough entries past the threshold to hold the number of packets that continue to arrive due to the latencies associated with asserting back-pressure and actually halting the packets. If an overflow of an input FIFO should occur, the error condition is latched and an interrupt is asserted if enabled.

A software programmable timeout is implemented upon the reading of each input FIFO 100*a–n*. If an input FIFO has not been read for some time and the timeout occurs, a read from the input FIFO will be forced and the packet is discarded. This frees up any head-of-line blocking in the input FIFO(s) that may have been caused by the failure to read the FIFO. A maskable interrupt is set indicating to software that the error condition has occurred. The timeout counter is restarted at the discard. The read, discard, interrupt operation will occur every time the timeout is exceeded.

The hardware and software controlled resets are provided by the Processor Interface Module. The hardware reset is asserted asynchronously and negated synchronously. Software reset is synchronously asserted and negated. Processor accessible logic is not reset by software reset.

The grant counter audit feature that works in conjunction with the system level VOQ/Grant Counter Audit Mechanism is supported by a mechanism that is triggered by information obtained by snooping on the packet grant 36 and packet arrival 34 interfaces that exist between the Tx MAC 31*x* and arbiter 12, and Rx MAC 30*a–n* and arbiter 12 respectively. The packet cross-connect 10 translates both of the interfaces from an input port strobe and associated data field that specifies a VOQ to audit to an output port strobe and data field that specifies the input grant counter to audit. The following is the grant counter component of the audit sequence.

Upon a header error check (HEC) error, or whenever desired, software initiates the audit of the 6 VOQs associated with each I/O port. For each of the 6 VOQs to be audited, software writes the VOQ ID to the GAP that triggers the audit starting at the GAP. The GAP sends an "Initiate VOQ audit" type VOQ arrival message to the arbiter 12 via the upstream (i.e. toward the cross-connect) input bus 18*a–n*. The message includes the VOQ number to be audited. Upon reception of the "Initiate VOQ audit" type VOQ message, the arbiter 12 performs audit operations and passes the audit flag back to the originating GAP as a "Terminate VOQ/Initiate Grant Audit" type grant message via the downstream output bus 19*a–n*. The packet cross-connect 10 detects the audit code on the packet grant interface, translates the strobe/VOQ data to the appropriate strobe/grant counter identifier and starts the grant counter audit by saving a copy of the specified grant counter. The cross-connect decrements the copy of the grant counter as packets of the VOQ being audited are transferred across the packet cross-connect. The grant counter copy is decremented until the terminate audit flag is passed to the GRX.

The GAP receives the "Terminate VOQ/Initiate Grant Audit" type grant message after it has traversed the GAP's grant queue. The GAP passes the audit flag to the GRX, this time as a "Terminate Grant Audit" type VOQ arrival message.

When the "Terminate Grant Audit" type VOQ arrival message is received by the packet cross-connect 10, it translates the strobe/VOQ data to the appropriate strobe/grant counter identifier and enters the information in a queue that operates in parallel with the associated input FIFO. The audit terminate flag emerges from the queue and is passed to the output port as the packet it arrived with is transferred across the cross-connect. When the output port controller receives the terminate flag, the decrement of the saved grant counter is stopped after counting the associated packet. Any remainder in the counter indicates the amount of error. The remainder is automatically applied to the grant counter under audit to correct the error. The termination and amount of error are reported to management software. This prevents any of the grant counters from drifting upwards due to lost packets granted but not processed.

Those of skill in the art will recognize that the packet cross-connect of the present invention is not tied to the system in which such a cross-connect can reside. The system context provided herein is exemplary only, and is used to convey the manner in which the cross-connect of the present invention would interact with such a system. Provided that similar interface signals are provided between the cross-connect of the present invention and the system context in which it is employed, the present invention, as well as the features thereof, remains patentably distinct from the system. For more information regarding the interface and implementation details of the present invention, please refer to the GRX ASIC Packet Crosspoint Module Specification, attached as Attachment C to related and co-filed U.S. application Ser. No. 09/874,352 entitled "Concurrent Switching of Synchronous and Asynchronous Traffic" by Jason Dove et al.

What is claimed is:

1. A method of regulating the rate of packet grants for an asynchronous cross-point switch, said method comprising:

incrementing, in a plurality of output ports of the asynchronous cross-point switch, a corresponding plurality of grant counters, in response to packet grants issued by an arbiter to multiple traffic sources that maintain virtual output queues (VOQs);

wherein the packet grants are to be used for release, by the multiple traffic sources on corresponding multiple buses to the input ports of the asynchronous cross-point switch, of packets having particular output ports of the asynchronous cross-point switch as destinations, for transfer through the asynchronous cross-point switch; and decrementing a grant counter when a packet with a particular output port as destination is read out from a corresponding buffer in the asynchronous cross-point switch; and instructing the arbiter to cease issuing grants for packets having an output port as destination once a corresponding grant counter for said output port has exceeded a predetermined threshold;

wherein the arbiter issues packet grants based on VOQ images in the arbiter, and responsive to instructions from the asynchronous cross-point switch.

2. The method of claim 1 further comprising:

negating the instruction to the arbiter to cease issuing grants, based at least on a hysteresis setting; and discarding another packet if an input buffer in a traffic source has not been read when a time out occurs.

3. The method of claim 1 wherein:

the predetermined threshold is programmable by writing to a predetermined register.

4. The method of claim 1 further comprising:

periodically auditing the grant counters to avoid upward drift due to loss of packets.

5. The method of claim 1 further comprising:

instructing the arbiter to cease issuing grants for packets to be stored in the corresponding buffer once the corresponding buffer has exceeded an additional predetermined threshold.

6. A method of regulating the rate of packet grants for an asynchronous cross-point switch, said method comprising:

snooping packet grants issued by an arbiter to multiple traffic sources that maintain virtual output queues (VOQs);

wherein the packet grants are issued to be used by the traffic sources to release to input ports of the asynchronous cross-point switch, packets having particular output ports of the asynchronous cross-point switch as destinations;

incrementing in the asynchronous cross-point switch, a plurality of grant counters associated with particular output ports as destinations, in response to said snooping;

decrementing a grant counter when a packet with a particular output port as destination is read out from a corresponding buffer in the asynchronous cross-point switch;

instructing the arbiter to cease issuing grants for packets having an output port as destination once a corresponding grant counter for said output has exceeded a predetermined threshold;

negating the instruction to the arbiter to cease issuing grants, based at least on a hysteresis setting;

instructing the arbiter to cease issuing grants for packets to be stored in the corresponding buffer once the corresponding buffer has exceeded an additional predetermined threshold; and auditing the grant counters to avoid upward drift due to loss of packets, wherein the arbiter issues packet grants based on VOQ images in the arbiter, and responsive to instructions from the asynchronous cross-point switch.

7. The method of claim 6 further comprising:

inserting, at the output ports of the asynchronous cross-point switch, the packet grants into packets to be transmitted to the traffic sources.

8. The method of claim 6 further comprising:

inserting, at the output ports of the asynchronous cross-point switch, packet grants and back-pressure fields into packets to be transmitted to the traffic sources.

9. An asynchronous cross-point switch that regulates the rate of packet grants, the asynchronous cross-point switch comprising:

an interface for receiving packet grants issued by an arbiter to traffic sources that maintain virtual output queues (VOQs);

wherein the packet grants are for release by the traffic sources of packets having particular output ports as destinations, to be transferred through the asynchronous cross-point switch;

a plurality of grant counters, for particular output ports as destinations;

means, coupled to the grant counters and to the interface, for incrementing the grant counters in response to receipt of the packet grants issued by the arbiter;

a plurality of buffers, for holding packets with particular output ports as destinations;

means, coupled to the grant counters and to the buffers, for decrementing a grant counter when a packet with a particular output port as destination is read out from a corresponding buffer; and means, coupled to the grant counters, for instructing the arbiter to cease issuing grants for packets having an output port as destination once a corresponding grant counter for said output port has exceeded a predetermined threshold.

10. The asynchronous cross-point switch of claim 9 further comprising:

means for negating the instruction to the arbiter to cease issuing grants, based at least on a hysteresis setting.

11. The asynchronous cross-point switch of claim 9 further comprising:

means for periodically auditing the grant counters to avoid upward drift due to loss of packets.

12. The asynchronous cross-point switch of claim 9 further comprising:

means for instructing the arbiter to cease issuing grants for packets to be stored in a buffer, once the buffer has exceeded an additional predetermined threshold.

13. The asynchronous cross-point switch of claim 9 comprising:

means for inserting, at the output ports of the asynchronous cross-point switch, packet grants and back-pressure fields into packets to be transmitted to the traffic sources.

* * * * *

UNITED STATES PATENT AND TRADEMARK OFFICE
CERTIFICATE OF CORRECTION

| | | |
|---|---|---|
| PATENT NO. | : 7,068,672 B1 | |
| APPLICATION NO. | : 09/874395 | |
| DATED | : June 27, 2006 | |
| INVENTOR(S) | : James W. Jones | |

It is certified that error appears in the above-identified patent and that said Letters Patent is hereby corrected as shown below:

(56) References Cited

Please insert the following U.S. PATENT DOCUMENTS:

| | | |
|---|---|---|
| 5,119,367 | 06-1992 | Kawakatsu et al. |
| 5,295,135 | 03-1994 | Kammerl, Anton |
| 5,365,521 | 11-1994 | Ohnishi et al. |
| 5,455,826 | 10-1995 | Ozveren et al. |
| 5,500,858 | 03-1996 | McKeown |
| 5,577,035 | 11-1996 | Hayter et al. |
| 5,604,867 | 02-1997 | Harwood, Michael J. |
| 5,710,549 | 10-1998 | Horst et al. |
| 5,781,320 | 07-1998 | Byers, Charles Calvin |
| 5,923,644 | 07-1999 | McKeown et al. |
| 5,982,771 | 11/09/1999 | Caldara et al. |
| 5,987,026 | 11-1999 | Holland, Peter |
| 6,014,367 | 01-2000 | Joffe |
| 6,014,431 | 01-2000 | McHale et al. |
| 6,072,800 | 06-2000 | Lee |
| 6,134,217 | 10-2000 | Stiliadis et al. |
| 6,160,812 | 12-2000 | Bauman et al. |
| 6,181,694 | 01-2001 | Pickett, Scott K. |
| 6,195,355 | 02-2001 | Demizu |
| 6,262,986 | 07-2001 | Oba et al. |
| 6,327,253 | 12-2001 | Frink |
| 6,385,678 | 02-2002 | Jacobs et al. |
| 6,389,480 | 05-2002 | Kotzur et al. |
| 6,501,731 | 12-2002 | Chong et al. |
| 6,798,784 | 09-2004 | Dove et al. |

Please insert the following OTHER PUBLICATIONS:

PCT/US02/17515 PCT Search Report, dated 12 Dec. 2002, 1 pg;

PCT/US02/17515 Int'l Preliminary Examination Report, dated 12 Nov. 2003, 7 pgs;

Office Action dated September 28, 2004, (US Patent Application 10/199,996) (8 pages);

Response to Amendment dated September 28, 2004, (US Patent Application 10/199,996), filed January 24, 2005, (8 pages);

UNITED STATES PATENT AND TRADEMARK OFFICE
CERTIFICATE OF CORRECTION

| | | |
|---|---|---|
| PATENT NO. | : 7,068,672 B1 | |
| APPLICATION NO. | : 09/874395 | |
| DATED | : June 27, 2006 | |
| INVENTOR(S) | : James W. Jones | |

It is certified that error appears in the above-identified patent and that said Letters Patent is hereby corrected as shown below:

Office Action dated September 28, 2004 in EP Application No. 03254534.5-2416 based on US Patent Application 10/199,996 (5 pages total excluding cover sheet);

Search Report dated October 15, 2003 in EP Application No. 03254534.5-2416 based on US Patent Application 10/199,996 (2 pages total excluding cover sheet);

"The iSLIP scheduling algorithm for input-queued switches," by N. W. McKeown in IEEE/ACM Transactions on Networking, vol. 7, no. 2, April 1999;

T. Anderson, S. Owicki, J. Saxe and C. Thacker, "High Speed Switch for Local Area Networks", ACM Transactions on Computer Systems, vol. 11, no. 4, Nov. 1993 pp. 1-13;

N. W. McKeown, M. Izzard, A. Mekkittikul, W. Ellersick and M. Horowitz, "The tiny tera: A packet switch core", Hot Interconnects V., August 1996, pp. 1-13;

A. Parekh, R. Gallager, "A Generalized Processor Sharing Approach To Flow Control in Integrated Services Networks: The Multiple Node Case", IEEE/ACM Transaction On Networking, VOL. 2, NO. 2, APRIL 1994, pp. 136-151;

A. Parekh, R. Gallager, "A Generalized Processor Sharing Approach To Flow Control in Integrated Services Networks: The Single Node Case", IEEE/ACM Transaction On Networking, Vol. 1, No. 2, JUNE 1993, pp. 344-357;

D. Stiliadis, A Varma, "Efficient Fair-Queueing Algorithms for Packet-Switched Networks", IEE/ACM Transaction On Networking, Vol. 6, No. 2, 1998, Article No. 27473, pp. 1-11 and B.1-B.2;

M. Goureau, S. Kolliopoulos, S. Rao, "Scheduling Algorithms for Input-Queued Switches: Randomized Techniques and Experimental Evaluation", IEEE/Infocom 2000, pp. 1634-1643;

J. Bennett, Hui Zhang "Why WFQ Is Not Good Enough For Integrated Services Networks", 1996, pp. 1-8;

N. McKeown, A. Mekkittikul, V. Anantharam, J. Walrand, "Achieving 100% Throughput in an Input-Queued Switch", IEEE Transaction Communications, Vol. 47, No. 8, August 1999, (22 pages);

UNITED STATES PATENT AND TRADEMARK OFFICE
CERTIFICATE OF CORRECTION

PATENT NO.         : 7,068,672 B1
APPLICATION NO. : 09/874395
DATED                 : June 27, 2006
INVENTOR(S)       : James W. Jones It is certified that error appears in the above-identified patent and that said Letters Patent is hereby corrected as shown below:

I. Stoica, S. Shenker, H. Zhang, "Core-Stateless Fair Queueing: Achieving Approximately Fair Bandwidth Allocations in High Speed Networks", Http://www-2.cs.cmu.edu/~istoica/sig98talk/, 1998, pp1-20;

N. KcKeown, "Scheduling Algorithms for Input-Queued Cell Switches", © 1995, pp. 1-119;

R. Schoenen, "An Architecture Supporting Quality-of-Service in Virtual-Output-Queued Switches", iEICE Transaction Communications, Vol. E83-B, No. 2, February 2000, pp. 1-10;

M.J.G. van Uitert, S.C. Borst, "A Reduced-Load Equivalence For Generalized Processor Sharing Networks With Heavy-Tailed Input Flows", Probability, Networks and Algorithms (PNA), PNA-R007, August 31, 2000, pp. 1-37;

N. Joy, K. Jamadagni, "Optimal Call Admission Control in Generalized Processor Sharing (GPS) Schedulers", IEEE Infocom 2001, pp. 1-10;

D. Stiliadis, A. Varma, "Rate-Proportional Servers: A Design Methodology for Fair Queueing Algorithms", UCSC-CRL-95-58, December 1995, pp. 1-22 and A.1-A.4;

D. Staliadis, A. Varma, "Latency-Rate Servers: A General Model for Analysis of Traffic Scheduling Algoriths", IEEE/ACM Transactions of Networking, Vol. 6, No. 5, October 1998, pp. 611-624;

M. Vishnu, "Implementing VirtualClock without Cell Stamps", IEEE Communications Letters, 1997, pp. 1-3;

M. Vishnu, J. Mark, "A Flexible Service Scheduling Scheme for ATM Networks", DBLP Record 'conf/infocom/VishnuM96, pp. 647-654;

M. Vishnu, J. Mark, "Reference Queue Tracking Strategies for Delay Guarantees in ATM Networks", November 4, 1997, pp. 1-22;

UNITED STATES PATENT AND TRADEMARK OFFICE
CERTIFICATE OF CORRECTION

PATENT NO. : 7,068,672 B1
APPLICATION NO. : 09/874395
DATED : June 27, 2006
INVENTOR(S) : James W. Jones

It is certified that error appears in the above-identified patent and that said Letters Patent is hereby corrected as shown below:

M. Vishnu, J. Mark, "Reference Queue Tracking Strategies for Delay Guarantees in ATM Networks", November 22, 1999, pp. 1-18;

M. Vishnu, J. Mark, "HOL-EDD: A Novel Service Scheduling Scheme for ATM Networks", June 16, 1997, pp. 1-23.

Signed and Sealed this

First Day of April, 2008

JON W. DUDAS
*Director of the United States Patent and Trademark Office*